United States Patent [19]
Hachida et al.

[11] Patent Number: 5,581,439
[45] Date of Patent: Dec. 3, 1996

[54] GAS INSULATED SWITCHGEAR

[75] Inventors: Masaki Hachida; Hirohiko Yatsuzuka; Takanobu Aoyama, all of Hitachi, Japan

[73] Assignee: Hitachi, Ltd., Tokyo, Japan

[21] Appl. No.: 495,835

[22] Filed: Jun. 28, 1995

[30] Foreign Application Priority Data

Jul. 5, 1994 [JP] Japan ..................... 6-153285

[51] Int. Cl.⁶ ........................................ H02B 1/20
[52] U.S. Cl. .............................................. 361/612
[58] Field of Search ........................ 361/601–602, 361/605, 611–612, 624, 637–639, 648

[56] References Cited

U.S. PATENT DOCUMENTS

| | | | |
|---|---|---|---|
| 4,752,860 | 6/1988 | Romanet et al. | 361/602 |
| 4,862,319 | 8/1989 | Suzuyama et al. | 361/612 |

FOREIGN PATENT DOCUMENTS

| | | | |
|---|---|---|---|
| 61-27966 | 6/1986 | Japan. | |
| 1227604 | 9/1989 | Japan | 361/612 |
| 3049510 | 3/1991 | Japan | 361/612 |

*Primary Examiner*—Gregory D. Thompson
*Attorney, Agent, or Firm*—Fay, Sharpe, Beall, Fagan, Minnich & McKee

[57] ABSTRACT

The gas insulated switchgear includes a gas insulated double main bus, bus sectioning and bus tieing gas insulated switchgear units, a main bus potential transformer and a main bus work use earthing switch for respective main buses. The bus sectioning and bus tieing gas insulated switchgear units are respectively constituted by a vertical type circuit breaker, and the main bus potential transformer and the main bus work earthing switch provided for one of two main buses. When the vertically disposed circuit breaker is used for the bus sectioning and the bus tieing gas insulated switchgear units, the entire device is decreased in size in the horizontal direction.

8 Claims, 4 Drawing Sheets

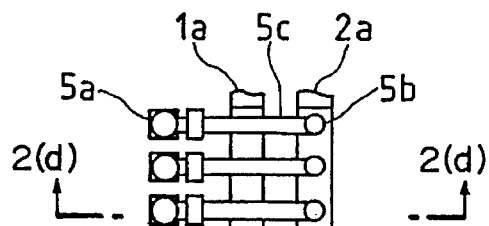
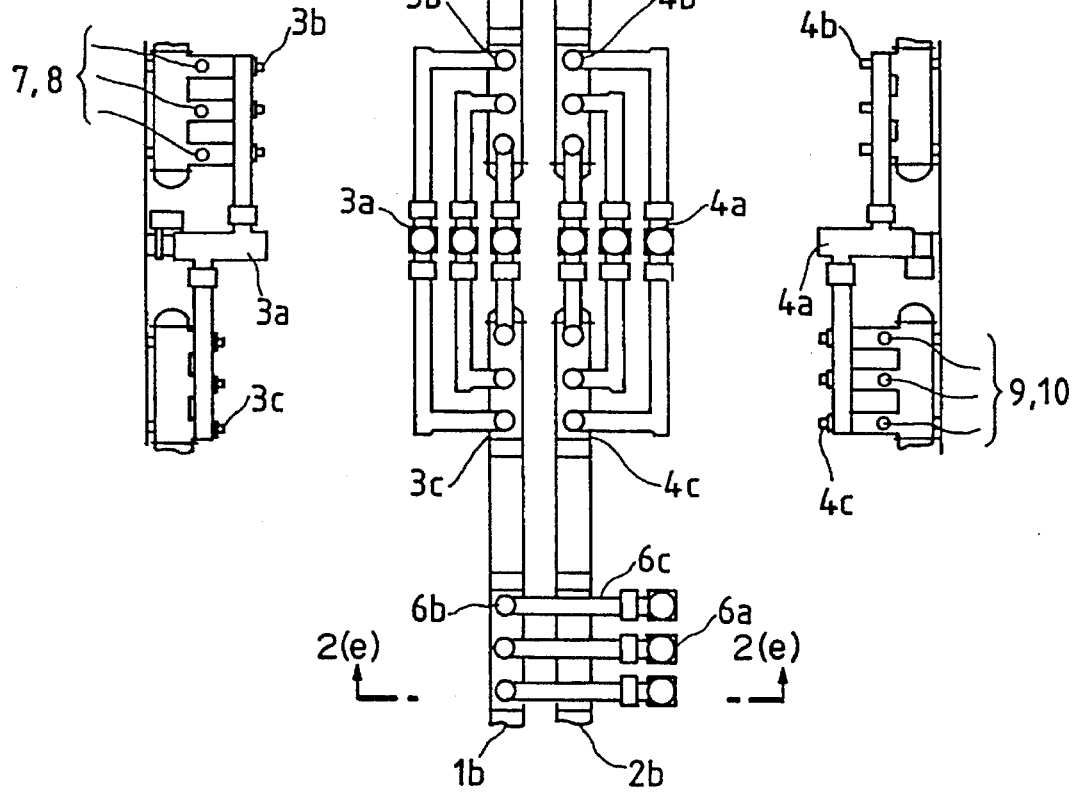
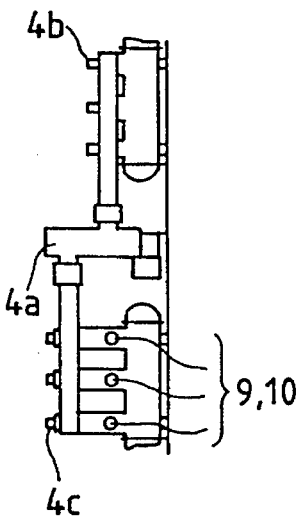
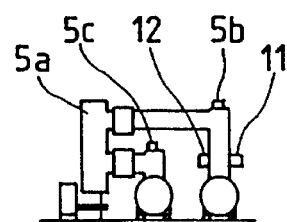
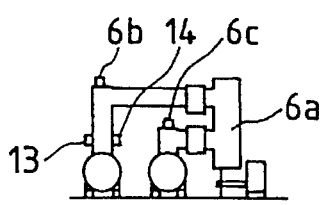

FIG. 4(a)
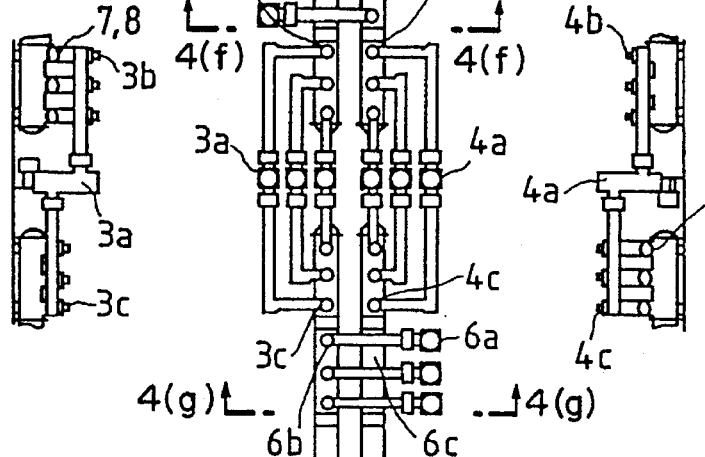
FIG. 4(b)
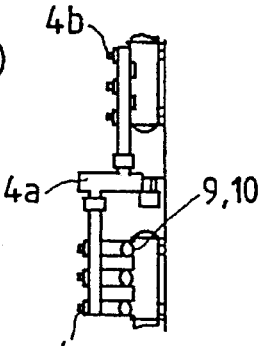
FIG. 4(c)
FIG. 4(d)
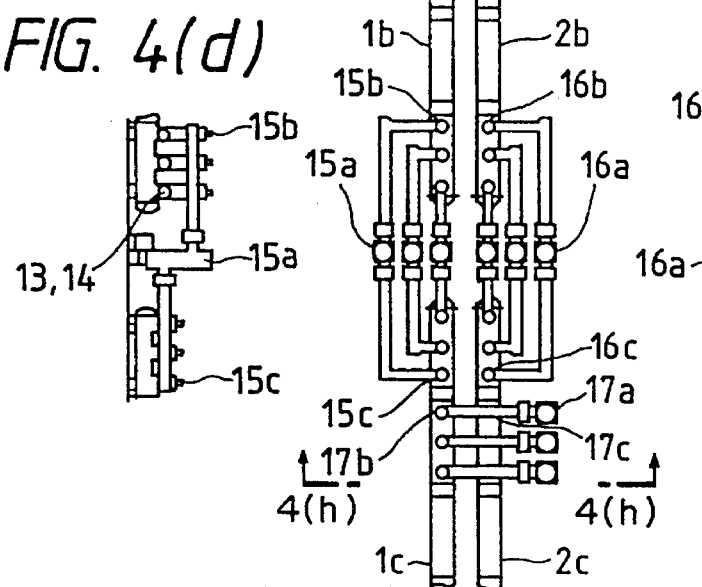
FIG. 4(e)
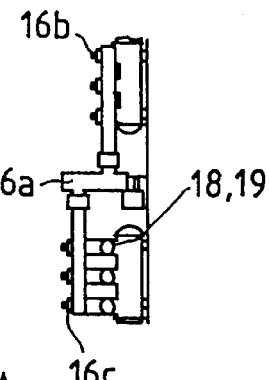
FIG. 4(f)
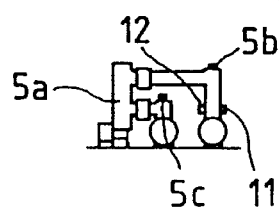
FIG. 4(g)
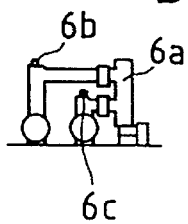
FIG. 4(h)
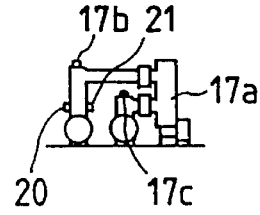

5,581,439

GAS INSULATED SWITCHGEAR

BACKGROUND OF THE INVENTION

1. Field of the Industrial Application

The present invention relates to a gas insulated switchgear of a double bus system including a bus sectioning use and a bus tieing use gas insulated switchgear unit which are used such as in a double bus four bus tie system.

2. Conventional Art

In order to decrease the size of the gas insulated switchgear and to shorten the bus length a variety of ideas have been also proposed for the arrangement of a bus potential transformer (hereinbelow abbreviated as bus PT) and a bus work earthing switch (hereinbelow abbreviated as bus ES). Among these ideas is a gas insulated switchgear in which bus PT and bus ES dedicated units are disposed separate from a switchgear unit. Also, a gas insulated switchgear is provided such that bus PTs and bus ESs for all of the main buses are collectively disposed in a bus sectioning gas insulated switchgear unit. Further, JP-B-61-27966(1986) discloses an example of conventional gas insulated switchgears.

In order to meet a primary requirement of connection between two main buses via a switching device with a minimum distance as well as to meet a newly added requirement to additionally dispose a bus PT and a bus ES, the arrangement of the bus sectioning and the bus tieing gas insulated switchgear unit in the above explained conventional countermeasure results in the expansion, by stacking multiples of the units. As a result, problems such as the elongation of the bus, enlargement of installation area and poor earthquake resistance are caused.

SUMMARY OF THE INVENTION

An object of the present invention is to provide a gas insulated switchgear in which the bus elongation encountered in the above countermeasures necessitated by the arrangement of the bus PT and the bus ES is eliminated and the length of the bus connecting the switching device and the main bus is shortened.

When a vertically disposed circuit breaker is used for the bus sectioning and the bus tieing gas insulated switchgear unit, the entire device is down-sized in the horizontal direction. Further, branching buses are led out from the top and bottom of the circuit breaker and are connected to main buses via a bus disconnecting switch with a minimum distance. The branching bus led out from the top of the circuit breaker is extended horizontally with the same height until a point immediately above the main bus, where it is bent immediately downward and is connected with the main bus. Then at the perpendicularly bent portion of the branching bus immediately above the main bus a bus disconnecting switch is disposed. Between the main bus and the bus disconnecting switch a bus PT and a bus ES can be disposed.

Further, by arranging the bus sectioning gas insulated switchgear units for the facing lines of the double main buses in a manner reversed from each other, the bus PT and the bus ES can be arranged in point symmetry with reference to the bus section and further a bus PT and a bus ES for another line which can not be arranged in the bus sectioning gas insulated switchgear unit can be arranged in the bus tieing gas insulated switchgear unit.

Through the use of a vertically disposed type of circuit breaker in the bus sectioning and the bus tieing gas insulated switchgear unit and through the arrangement of the bus PT and the bus ES at the branching bus portion led out from the top of the circuit breaker, the bus elongation encountered in the conventional devices necessitated by the arrangement of the bus PT and the bus ES is eliminated and an optimum arrangement of the gas insulated switchgear as a whole is realized. As a result, the bus length and the installation area of the gas insulated switchgear as a whole are reduced and the deterioration of the earthquake resistance caused by stacking the elements in multiple layers is also prevented.

Further, since the bus PTs and the bus ESs are arranged in point symmetry in the bus sectioning gas insulated switchgear units, the bus sectioning gas insulated switchgear unit can be standardized for a gas insulated switchgear including a plurality of bus sectioning gas insulated switchgear units.

BRIEF DESCRIPTION OF THE DRAWINGS

FIG. 2(a) through FIG. 2(e) are schematic diagrams of the gas insulated switchgear as shown in FIG. 1, wherein FIG. 2(a) is a plane view thereof, FIG. 2(b) is a view seen from the left of FIG. 2(a) showing a left side view of a bus sectioning gas insulated switchgear unit, FIG. 2(c) is a view seen from the right of FIG. 2(a) showing a right side view of a bus sectioning gas insulated switchgear unit, FIG. 2(d) is a view seen from 2(d)—e(d) in FIG. 2(a) and FIG. 2(e) is a view seen from 2(e)—2(e) in FIG. 2(a);

FIG. 4(a) through FIG. 4(h) are schematic diagrams of the gas insulated switchgear as shown in FIG. 3, wherein FIG. 4(a) is a plane view thereof, FIG. 4(b) and FIG. 4(d) are views seen from the left of FIG. 4(a) showing left side views of bus sectioning gas insulated switchgear units, FIG. 4(c) and FIG. 4(e) are views seen from the right of FIG. 4(a) showing right side views of bus sectioning gas insulated switchgear units, FIG. 4(f) is a view seen from 4(f)—4(f) in FIG. 4(a), FIG. 4(g) is a view seen from 4(g)—4(g) in FIG. 4(a) and FIG. 4(h) is a view seen from 4(h)—4(h) in FIG. 4(a).

DETAILED DESCRIPTION OF THE PREFERRED EMBODIMENTS

Figure 1:
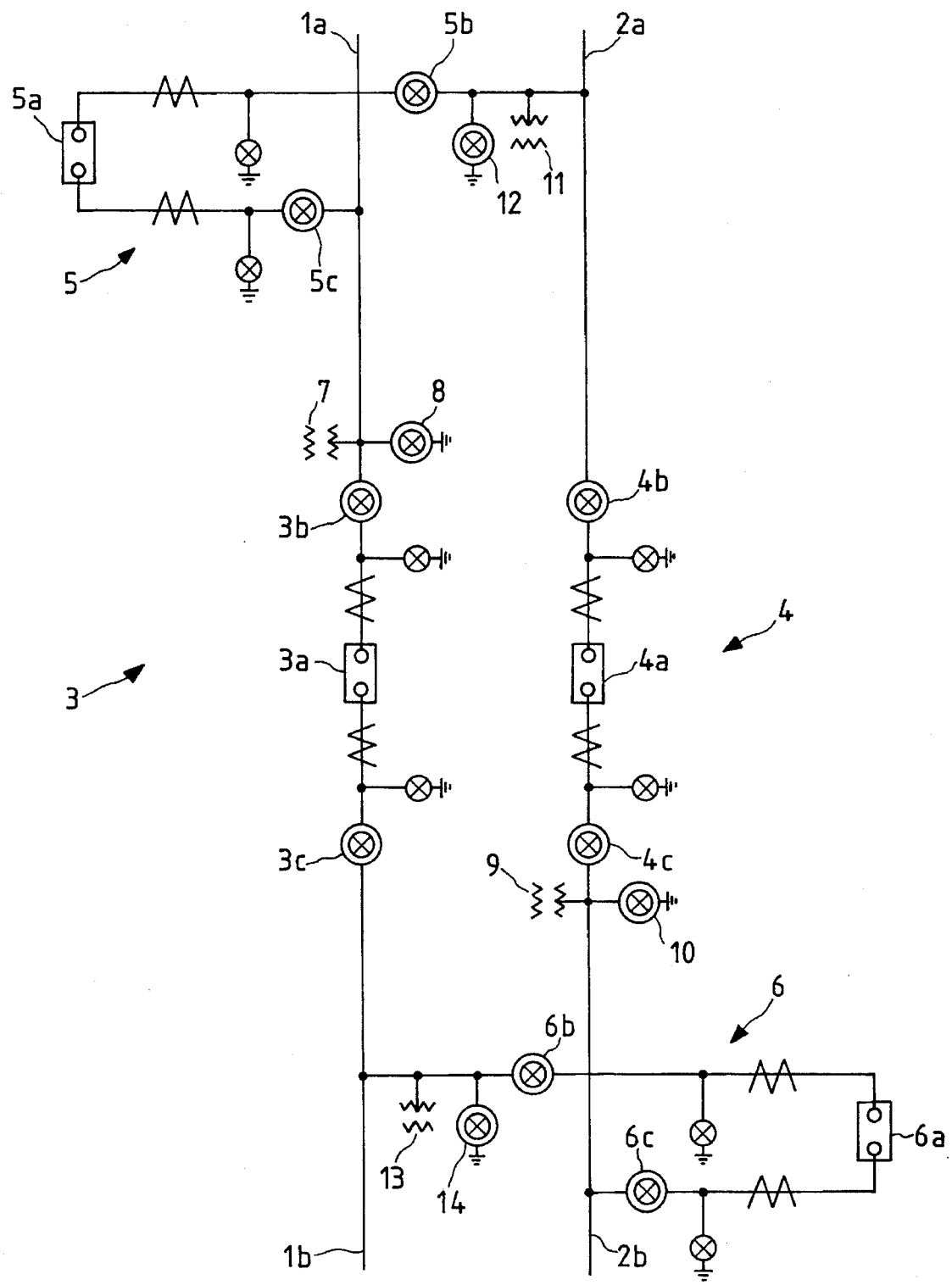
FIG. 1 is a single line diagram of one embodiment of a gas insulated switchgear of a double bus four bus tie system according to the present invention.

Hereinbelow, embodiments of the present invention are explained specifically with reference to the drawings. FIG. 1 and FIG. 2(a) through FIG. 2(e) are a single line diagram and schematic diagrams of an example of a gas insulated switchgear of a double bus four bus tie (bus tie 1CB) type according to an embodiment of the present invention. Main buses $1a$, $1b$, $2a$ and $2b$ are respectively constituted by a gas insulated bus of three phase collective type, the main buses $1a$ and $1b$ are arranged on substantially the same axis and the main buses $2a$ and $2b$ are arranged on substantially the same horizontal plane as the main buses $1a$ and $1b$ at the position facing thereto. The main buses $1a$ and $1b$, and the main buses $2a$ and $2b$ are respectively sectioned by bus sectioning gas insulated switchgear units 3 and 4 and the main buses $1a$ and $2a$, and the main buses $1b$ and $2b$ are respectively connected via bus tieing gas insulated switchgear units 5 and 6.

Each of gas circuit breakers 3a and 4a for the bus sectioning gas insulated switchgear units 3 and 4 is disposed vertically and from the top and bottom of the gas circuit breaker respective branching buses are led out.

A lead conductor portion for the main bus 1b of the bus sectioning gas circuit breaker 3a sectioning between the main buses 1a and 1b is led out from the lower portion of the circuit breaker 3a in the axial direction of the main bus 1b and is connected to the main bus 1b via a disconnecting switch 3c, and a lead conductor portion for the main bus 1a is led out from the upper portion of the circuit breaker 3a in the axial direction of the main bus 1a and is connected to the main bus 1a via a disconnecting switch 3b. Further, only at the branching bus portion between the main bus 1a and the disconnecting switch 3b a bus PT 7 and a bus ES 8 for the main bus 1a are respectively provided.

A lead conductor portion for the main bus 2a of the bus sectioning gas circuit breaker 4a sectioning between the main buses 2a and 2b is led out from the lower portion of the circuit breaker 4a in the axial direction of the main bus 2a and is connected to the main bus 2a via a disconnecting switch 4b and a lead conductor portion for the main bus 2b is led out from the upper portion of the circuit breaker 4a in the axial direction of the main bus 2b and is connected to the main bus 2b via a disconnecting switch 4c. Further, only at the branching bus portion between the main bus 2b and the disconnecting switch 4c a bus PT 9 and a bus ES 10 for the main bus 2b are respectively provided.

Each of gas circuit breakers 5a and 6a for the bus tieing gas insulated switchgear units 5 and 6 is disposed vertically and from the top and bottom of the gas circuit breaker respective branching buses are led out.

A bus tieing gas circuit breaker 5a connecting the main buses 1a and 2a is disposed outside the main bus 1a, all of the lead conductor portions thereof are led out toward the main buses, a branching bus led out from the lower portion thereof is connected to the main bus 1a via a disconnecting switch 5c and a branching bus led out from the upper portion thereof is connected to the main bus 2a via a disconnecting switch 5b. Further, only at the branching bus portion between the main bus 2a and the disconnecting switch 5b a bus PT 11 and a bus ES 12 for the main bus 2a are respectively provided.

A bus tieing gas circuit breaker 6a connecting the main buses 1b and 2b is disposed outside the main bus 2b, all of the lead conductor portions thereof are led out toward the main buses, a branching bus led out from the lower portion thereof is connected to the main bus 2b via a disconnecting switch 6c and a branching bus led out from the upper portion thereof is connected to the main bus 1b via a disconnecting switch 6b. Further, only at the branching bus portion between the main bus 1b and the disconnecting switch 6b a bus PT 13 and a bus ES 14 for the main bus 1b are respectively provided.

With the above construction, the bus PTs and the bus ESs for the four main buses connected by the bus sectioning and the bus tieing gas insulated switchgear units are arranged in an optimum manner in the gas insulated switchgear.

Figure 3:
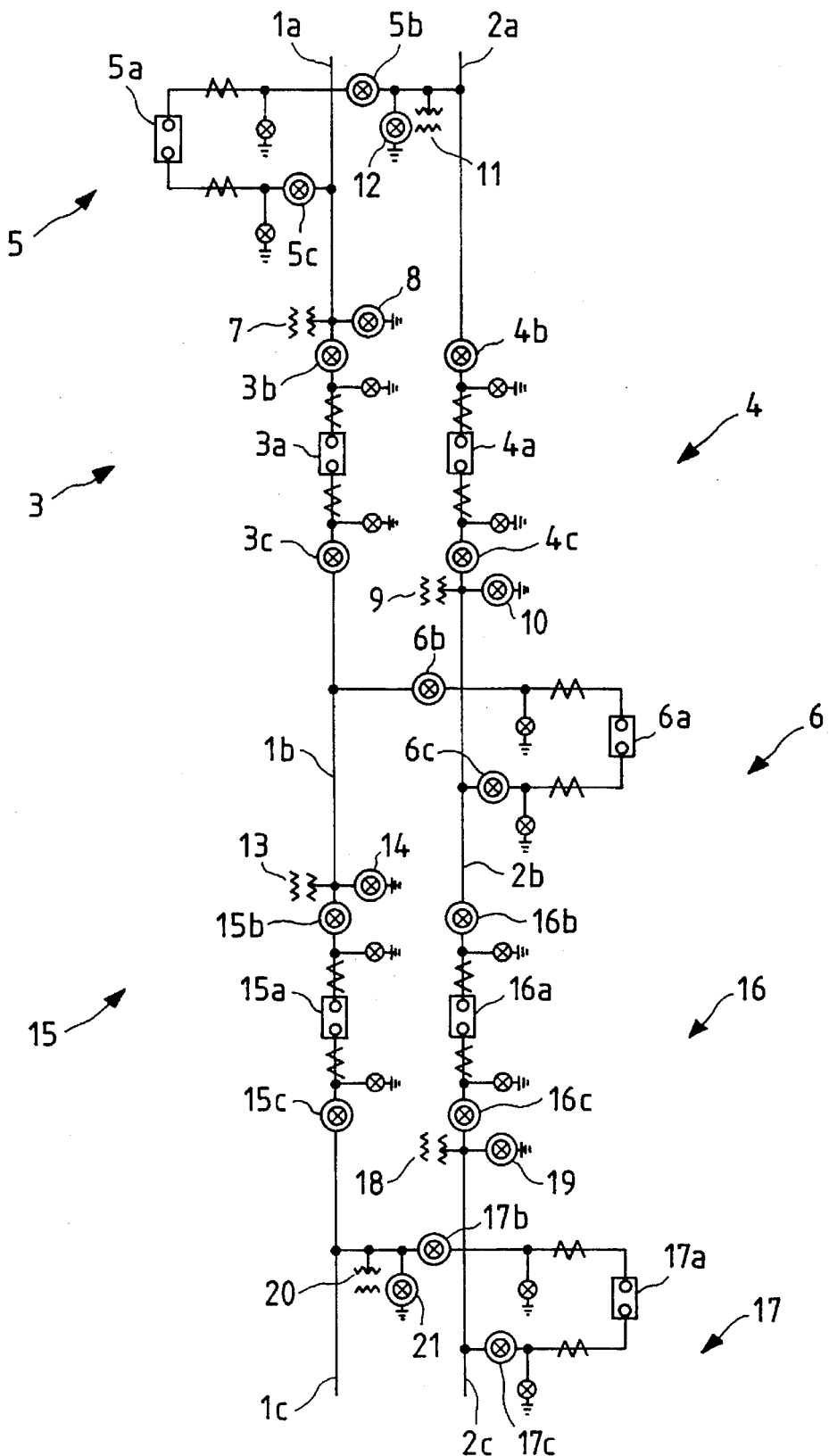
FIG. 3 is a single line diagram of another embodiment of a gas insulated switchgear of a double bus system each including a plurality of bus sectioning gas insulated switchgear units.

FIG. 3 and FIG. 4(a) through FIG. 4(h) are a single line diagram and schematic diagrams of an example of a gas insulated switchgear of a double bus type including a plurality of bus sectioning gas insulated switchgear units in one main bus in which the present invention is used. Main buses 1 and 2 are respectively constituted by a gas insulated bus of three phase collective type, and are sectioned into three sections a, b and c by respective bus sectioning gas insulated switchgear units 3, 15 and 4, 16.

A lead conductor portion for the main bus 1b of the bus sectioning gas circuit breaker 3a sectioning between the main buses 1a and 1b is led out from the lower portion of the circuit breaker 3a in the axial direction of the main bus 1b and is connected to the main bus 1b via a disconnecting switch 3c, and a lead conductor portion for the main bus 1a is led out from the upper portion of the circuit breaker 3a in the axial direction of the main bus 1a and is connected to the main bus 1a via a disconnecting switch 3b. Further, only at the branching bus portion between the main bus 1a and the disconnecting switch 3b a bus PT 7 and a bus ES 8 for the main bus 1a are respectively provided.

A lead conductor portion for the main bus 1c of the bus sectioning gas circuit breaker 15a sectioning between the main buses 1b and 1c is led out from the lower portion of the circuit breaker 15a in the axial direction of the main bus 1c and is connected to the main bus 1c via a disconnecting switch 15c, and a lead conductor portion for the main bus 1b is led out from the upper portion of the circuit breaker 15a in the axial direction of the main bus 1b and is connected to the main bus 1b via a disconnecting switch 15b. Further, only at the branching bus portion between the main bus 1b and the disconnecting switch 15b a bus PT 13 and a bus ES 14 for the main bus 1b are respectively provided.

A lead conductor portion for the main bus 2a of the bus sectioning gas circuit breaker 4a sectioning between the main buses 2a and 2b is led out from the lower portion of the circuit breaker 4a in the axial direction of the main bus 2a and is connected to the main bus 2a via a disconnecting switch 4b and a lead conductor portion for the main bus 2b is led out from the upper portion of the circuit breaker 4a in the axial direction of the main bus 2b and is connected to the main bus 2b via a disconnecting switch 4c. Further, only at the branching bus portion between the main bus 2b and the disconnecting switch 4c a bus PT 9 and a bus ES 10 for the main bus 2b are respectively provided.

A lead conductor portion for the main bus 2b of the bus sectioning gas circuit breaker 16a sectioning between the main buses 2b and 2c is led out from the lower portion of the circuit breaker 16a in the axial direction of the main bus 2b and is connected to the main bus 2b via a disconnecting switch 16b and a lead conductor portion for the main bus 2c is led out from the upper portion of the circuit breaker 16a in the axial direction of the main bus 2c and is connected to the main bus 2c via a disconnecting switch 16c. Further, only at the branching bus portion between the main bus 2c and the disconnecting switch 16c a bus PT 18 and a bus ES 19 for the main bus 2c are respectively provided.

A bus tieing gas circuit breaker 5a connecting the main buses 1a and 2a is disposed outside the main bus 1a, all of the lead conductor portions thereof are led out toward the main buses, a branching bus led out from the lower portion thereof is connected to the main bus 1a via a disconnecting switch 5c and a branching bus led out from the upper portion thereof is connected to the main bus 2a via a disconnecting switch 5b. Further, only at the branching bus portion between the main bus 2a and the disconnecting switch 5b a bus PT 11 and a bus ES 12 for the main bus 2a are respectively provided.

A bus tieing gas circuit breaker 17a connecting the main buses 1c and 2c is disposed outside the main bus 2c, all of the lead conductor portions thereof are led out toward the main buses, a branching bus led out from the lower portion thereof is connected to the main bus 2c via a disconnecting switch 17c and a branching bus led out from the upper portion thereof is connected to the main bus 1c via a disconnecting switch 17b. Further, only at the branching bus portion between the main bus 1c and the disconnecting switch 17b a bus PT 20 and a bus ES 21 for the main bus 1c are respectively provided.

Finally, for a bus tieing gas insulated switchgear unit 6 connecting the main bus 1b and 2b neither the bus PT or the bus ES are arranged.

With the above construction, in a gas insulated switchgear including a plurality of bus sectioning gas insulated switchgear units in one main bus all of the bus sectioning gas insulated switchgear units are structured in an identical manner to thereby realize standardization.

When a vertically disposed circuit breaker is used for the bus sectioning and the bus tieing gas insulated switchgear unit, the entire device is downsized in horizontal direction. Further, when disposing the circuit breaker vertically and leading out respective branching buses from the top and bottom thereof to corresponding main buses a length difference of the two branching buses is produced. Namely the branching bus led out from the top of the circuit breaker is longer than that led out from the bottom thereof by the height length of the circuit breaker. Accordingly, since the bus PT and the bus ES are disposed in the portion of the upper branching bus produced by the height difference between the upper and lower branching buses thereby an elongation of the bus is prevented.

We claim:

1. A gas insulated switchgear of a double bus system including a bus sectioning gas insulated switchgear unit and a bus tieing gas insulated switchgear unit wherein the bus sectioning gas insulated switchgear unit comprises a vertically disposed circuit breaker; branching buses leading out from top and bottom portions of said circuit breaker in parallel with an axis of main buses forming the double bus system; a disconnecting switch via which each of said branching buses is connected with said main buses; and a main bus potential transformer and a main bus work earthing switch provided at a portion of the branching buses leading out from the top of said circuit breaker and positioned between said disconnecting switch and said main bus.

2. A gas insulated switchgear according to claim 1 wherein the main bus potential transformer and the main bus work earthing switch in the respective bus sectioning gas insulated switchgear units for a first line and a second line of the double bus system are disposed at opposite ends of their respective bus sectioning gas insulated switchgear units with respect to each other.

3. A gas insulated switchgear of a double bus system including a bus sectioning gas insulated switchgear unit and a bus tieing gas insulated switchgear unit wherein the bus tieing gas insulated switchgear unit comprises a vertical circuit breaker which is disposed outside the double bus system; branching buses leading out from top and bottom portions of said circuit breaker and perpendicular to the axis of main buses; a disconnecting switch via which said branching bus is connected with said main bus; a main bus potential transformer and a main bus work earthing switch provided at a position of each of the branching buses leading out from the top of said circuit breaker and positioned between said disconnecting switch and said main bus and, wherein said vertical circuit breaker in said bus tieing gas insulated switchgear tieing first sections of a first line and a second line of said double bus system is disposed outside the double bus system at a side remote from said second line and said vertical circuit breaker in said bus tieing gas insulated switchgear unit tieing second sections of said first line and said second line is disposed outside the double bus system at a side remote from said first line.

4. A gas insulated switchgear according to claim 1 wherein in place of the main bus potential transformer and the main bus work earthing switch an arrestor is provided.

5. A gas insulated switchgear according to claim 2 wherein in place of the main bus potential transformer and the main bus work earthing switch an arrestor is provided.

6. A gas insulated switchgear according to claim 3 wherein in place of the main bus potential transformer and the main bus work earthing switch an arrestor is provided.

7. A gas insulated switchgear according to claim 2, wherein said vertical circuit breaker in said bus tieing gas insulated switchgear tieing first sections of the first line and the second line of said double bus system is disposed outside the double bus system at a side remote from said second line and said vertical circuit breaker in said bus tieing gas insulated switchgear unit tieing second sections of said first line and said second line is disposed outside the double bus system at a side remote from said first line.

8. A gas insulated switchgear according to claim 7 wherein in place of the main bus potential transformer and the main bus work earthing switch an arrestor is provided.

* * * * *